UNITED STATES PATENT OFFICE.

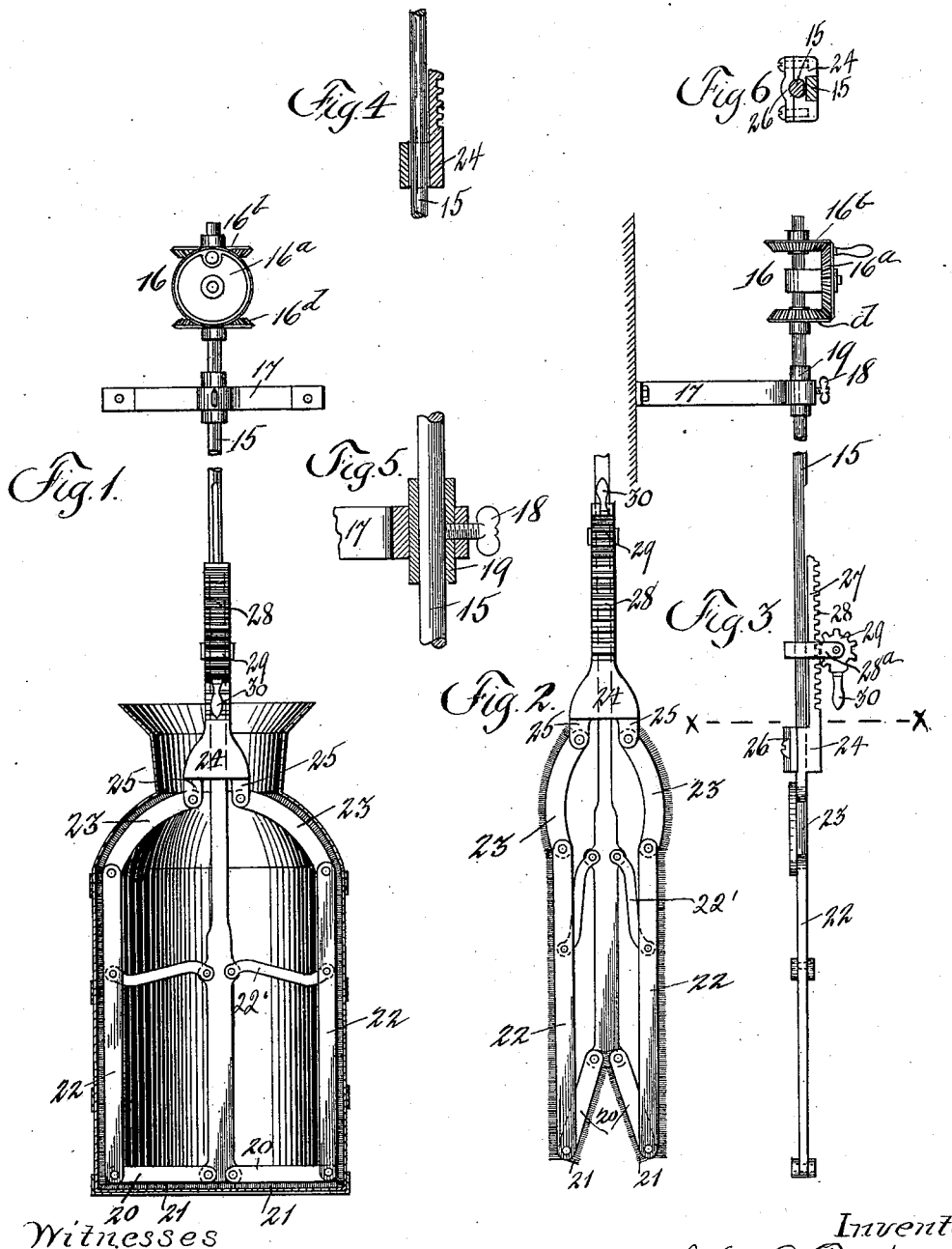

JOHN C. RUST, OF ORLAND, ILLINOIS.

CAN-CLEANER.

SPECIFICATION forming part of Letters Patent No. 565,234, dated August 4, 1896.

Application filed February 26, 1896. Serial No. 580,903. (No model.)

*To all whom it may concern:*

Be it known that I, JOHN C. RUST, a citizen of the United States, residing at Orland, in the county of Cook and State of Illinois, have invented certain new and useful Improvements in Milk-Can Cleaners, of which the following is a specification.

My invention relates to an improved apparatus whereby milk-cans may be thoroughly and expeditiously cleaned, and has for its object the provision of means whereby to simplify the mechanism and cheapen the cost of construction in certain details.

To this end my invention consists in certain details of improvement to be described, and particularly pointed out in my claim, reference being now had to the accompanying drawings, in which—

Figure 1 is a front elevation of my improved apparatus shown adjusted in use within a milk-can shown in section. Fig. 2 is a like view showing the apparatus collapsed and withdrawn from the milk-can. Fig. 3 is a side elevation of said apparatus, showing the manner of attachment to the wall of a building. Fig. 4 is a sectional detail view through the rack-head, showing the manner in which the actuating-shaft passes through said head. Fig. 5 is a sectional detail view showing the means for holding the apparatus in an elevated position out of the milk-can. Fig. 6 is a cross-section on the line $x\ x$ of Fig. 3.

In carrying out my invention I provide an actuating-shaft 15, which is driven either by hand or other suitable power through the instrumentality of the gearing 16, located at the upper end of said shaft, consisting of the hand-wheel 16$^a$, meshing with the gear-wheel 16$^b$, fast on the shaft 15, and also with the gear-wheel 16$^d$, loose on said shaft. Brackets 17, secured to the wall, hold the central shaft in a vertical position, a set-screw 18 passing through the sleeve 19 about the actuating-shaft 15, serving to hold the apparatus in an elevated position out of the can which has been cleaned.

I provide a number of brush-carrying sections, which are pivoted together and to the actuating-shaft 15 in the following manner: The lower sections 20, carrying suitable brushes 21, are respectively pivoted to the actuating-shaft 15 and to the side brush-carrying sections 22, which latter are pivoted at their upper ends to the top brush-carrying sections 23, and connected to the shaft 15 by links 22'. These top brush-carrying sections 23 are curved to conform to the outline of the top of a milk-can and extend inwardly toward the actuating-shaft 15. Mounted slidably upon the actuating-shaft 15 is a head 24, having lugs 25 depending therefrom, to which lugs the inner ends of the top brush-carrying sections 23 are pivoted. A cap-piece 26 is removably secured to the head 24 and serves to hold the same in position slidably upon the actuating-shaft 15. Extended upwardly from the head 24 is a rack-bar 27, having the rack 28 formed thereon, the actuating-shaft 15 being cut away for a certain length of its lower portion in order to permit said rack-bar to slide up and down upon the actuating-shaft 15. Projected from the actuating-shaft 15 at a point above the head 24 are the holding-arms 28$^a$, between which the tooth-head 29 is mounted to rotate about a suitable axis. The toothed head 29 is operated by a hand-lever 30 and its teeth engage those of the rack 28.

In order to extend the brush-cleaning sections from a collapsed position into an extended cleaning position, or to collapse the said sections, it is simply necessary to move the hand-lever 30 up or down, thus rotating the toothed head 29 and raising or lowering the rack-bar 27 and causing the head 24 to ride up and down on the actuating-shaft 15, and thus in turn either pushing down upon or raising up the top brush-carrying sections 23, the other brush-carrying sections then moving upon their pivots.

It is now evident from the foregoing that the operation of rapidly cleaning a number of cans one after the other is much simplified, since it is only necessary for the operator to depress the hand-lever 30 to extend the brush-carrying sections, as usually the weight of the sections and conjoint parts will lower into a collapsed position, although, if necessary, this result may be accomplished by an upward movement of the hand-lever 30. After one can has been cleaned by the brush-carrying sections extended and rotated within the interior of the can the sections may be collapsed together by gravity closure of the parts or by movement of the hand-lever 30 upward, the head 24 riding downwardly upon the actuating-shaft 15, the brush-carrying sections being then withdrawn from the interior of the can by manually drawing upward upon the actuating-shaft 15, which slides loosely through the sleeve 19, held by the brackets 17, another can being then quickly positioned between the collapsed brush-carrying sections, which are then lowered manually through the contracted neck into the interior of the can and the brush-carrying sections extended into a cleaning position by a simple movement downward of the hand-lever 30, which raises the rack-bar 27 and head 24$^a$ along the actuating-shaft 15 and thus pulling the parts into the extended position aforesaid.

Having thus described my invention, what I claim as new therein, and desire to secure by Letters Patent, is—

In a milk-can-cleaning apparatus the combination with brush-carrying sections pivoted together, of a driven shaft, the lower brush-carrying sections being pivoted to the shaft a head slidably mounted on said shaft, a rack-bar and rack extended from said head, a tooth-head axially held on the driven shaft and engaging the rack and a hand-lever for rotatively moving the toothed head and vertically moving the rack and slidable head along the actuating-shaft, which sliding head is pivotally connected with the brush-carrying sections whereby the said sections are extended or collapsed in order to insert or withdraw the apparatus into or from the can.

In testimony whereof I affix my signature in presence of two witnesses.

JOHN C. RUST.

Witnesses:
C. C. BULKLEY,
W. H. POORLEY.